US012211518B2

(12) United States Patent
Okuda

(10) Patent No.: US 12,211,518 B2
(45) Date of Patent: Jan. 28, 2025

(54) MEASUREMENT DEVICE, MEASUREMENT METHOD, RECORDING MEDIUM, AND PHONOGRAPH RECORD

(71) Applicant: Panasonic Intellectual Property Management Co., Ltd., Osaka (JP)

(72) Inventor: Tadayoshi Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 17/908,865

(22) PCT Filed: Nov. 6, 2020

(86) PCT No.: PCT/JP2020/041626
§ 371 (c)(1),
(2) Date: Sep. 1, 2022

(87) PCT Pub. No.: WO2021/229841
PCT Pub. Date: Nov. 18, 2021

(65) Prior Publication Data
US 2023/0109304 A1    Apr. 6, 2023

(30) Foreign Application Priority Data

May 11, 2020    (JP) .................................. 2020-083084

(51) Int. Cl.
*G11B 20/10*    (2006.01)
*G11B 3/38*    (2006.01)
(52) U.S. Cl.
CPC .......... *G11B 20/10398* (2013.01); *G11B 3/38* (2013.01)
(58) Field of Classification Search
CPC ................. H04R 29/00; H04R 29/001; G11B 20/10398; G11B 3/38
(Continued)

(56) References Cited

U.S. PATENT DOCUMENTS

| 3,019,024 | A | * | 1/1962 | Feinstein | ............... | G11B 23/30 |
| | | | | | | 369/132 |
| 4,186,281 | A | * | 1/1980 | Kasuga | ................... | H04S 3/006 |
| | | | | | | 369/90 |
| 4,306,113 | A | * | 12/1981 | Morton | .................... | H04R 3/04 |
| | | | | | | 455/226.1 |

(Continued)

FOREIGN PATENT DOCUMENTS

| JP | S54-094206 U | 7/1979 |
| JP | 56-011650 A | 2/1981 |

(Continued)

OTHER PUBLICATIONS

Len Gregory, HI-Fi news analogue test LP, Jun. 2, 2004, HFN 002 test LP.*

(Continued)

*Primary Examiner* — Disler Paul
(74) *Attorney, Agent, or Firm* — Rimon P.C.

(57) ABSTRACT

A playback device (measurement device) in a record playback system including a record player and the playback device measures a frequency characteristic of each of a plurality of input signals which are input from the record player to the playback device when a plurality of test signals for measuring a characteristic of the record playback system are played back by the record player, the plurality of test signals being recorded on a phonograph record, the plurality of input signals corresponding to the plurality of test signals recorded; calculates a measurement error between the frequency characteristic of each of the plurality of input signals measured and a predetermined frequency characteristic; selects a frequency characteristic of which the measurement error is smallest from among the frequency characteristics of the plurality of input signals, as a measurement result of the record playback system; and outputs the measurement result selected.

5 Claims, 10 Drawing Sheets

(58) Field of Classification Search
USPC .............................................. 381/58–59, 66
See application file for complete search history.

(56) References Cited

U.S. PATENT DOCUMENTS

| | | | | |
|---|---|---|---|---|
| 4,410,970 | A * | 10/1983 | Law | G11B 27/36 |
| | | | | 73/659 |
| 4,602,359 | A * | 7/1986 | Palmer | G11B 23/0021 |
| | | | | 369/53.41 |
| 5,740,146 | A * | 4/1998 | Webster | G11B 27/10 |
| | | | | 369/84 |
| 10,290,316 | B1 * | 5/2019 | Liu | G11B 3/085 |
| 10,657,986 | B2 * | 5/2020 | Cheon | G11B 3/38 |
| 2011/0080674 | A1 * | 4/2011 | Durand | G11B 3/31 |
| | | | | 360/294 |
| 2013/0028429 | A1 * | 1/2013 | Amada | H04R 1/1091 |
| | | | | 381/59 |

FOREIGN PATENT DOCUMENTS

| | | |
|---|---|---|
| JP | 56-020398 A | 2/1981 |
| JP | S57-087317 U | 5/1982 |
| JP | 58-033605 B2 | 7/1983 |

OTHER PUBLICATIONS

International Search Report issued on Feb. 2, 2021 in International Patent Application No. PCT/JP2020/041626, with English translation.
Extended European Search Report dated Sep. 12, 2023 issued in the corresponding European Patent Application No. 20935356.4.
Jack Feinstein: "Locked Concentric-Grooved Disc for Use in Measurements of Disc-Reproducer Performance", Journal of the Audio Engineering Society, vol. 4, No. 2, Apr. 1, 1956 (Apr. 1, 1956), pp. 76-81, XP002808803.

* cited by examiner

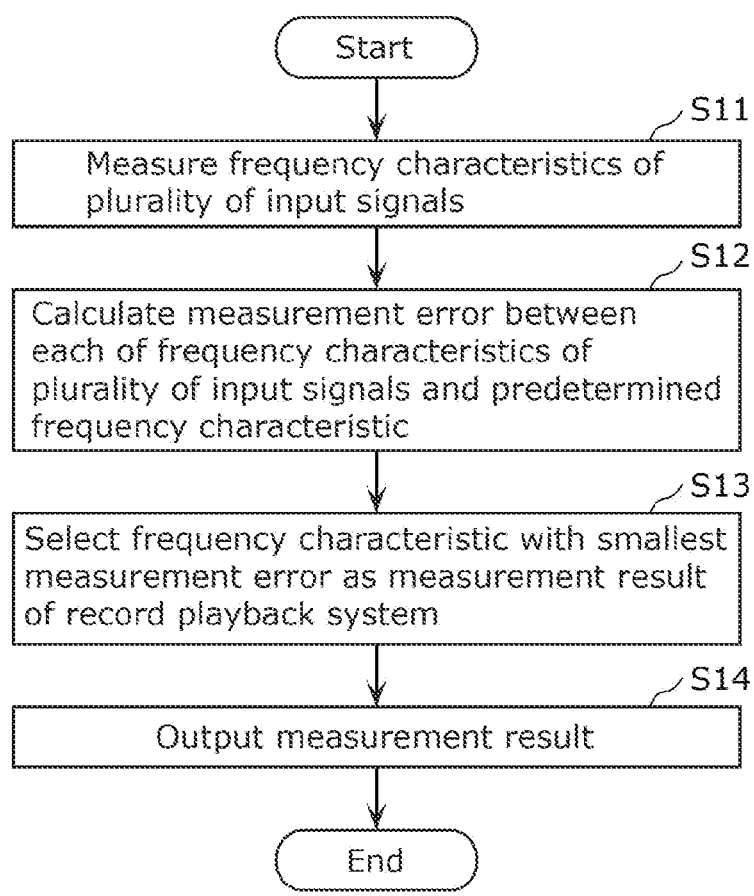

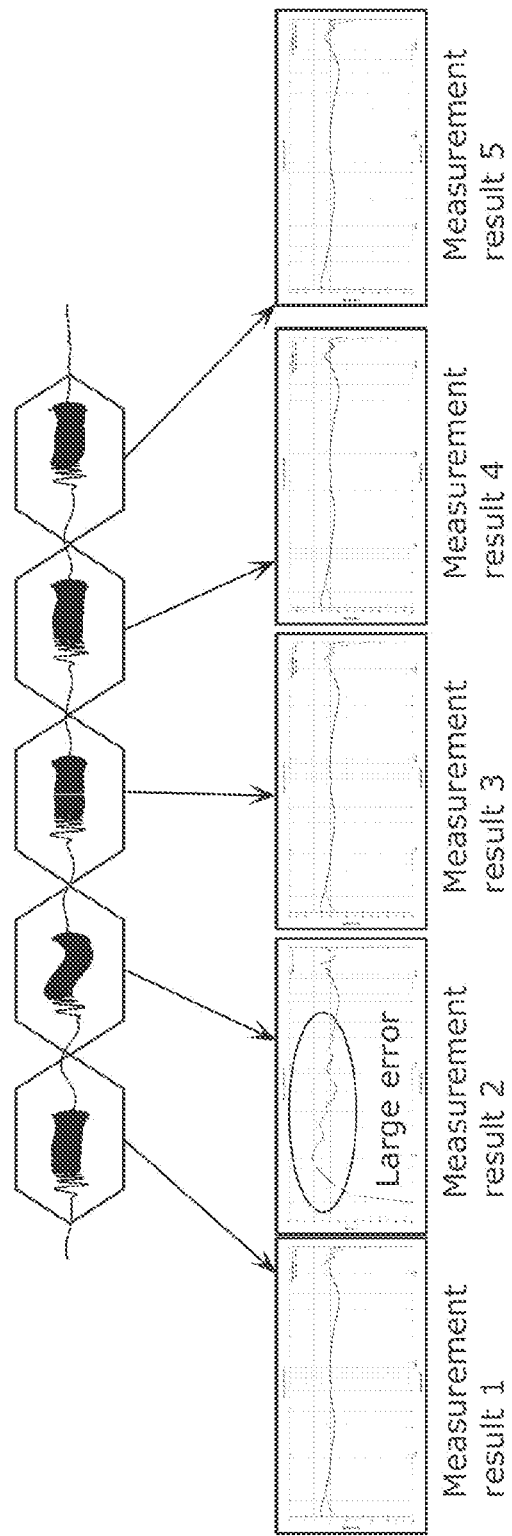

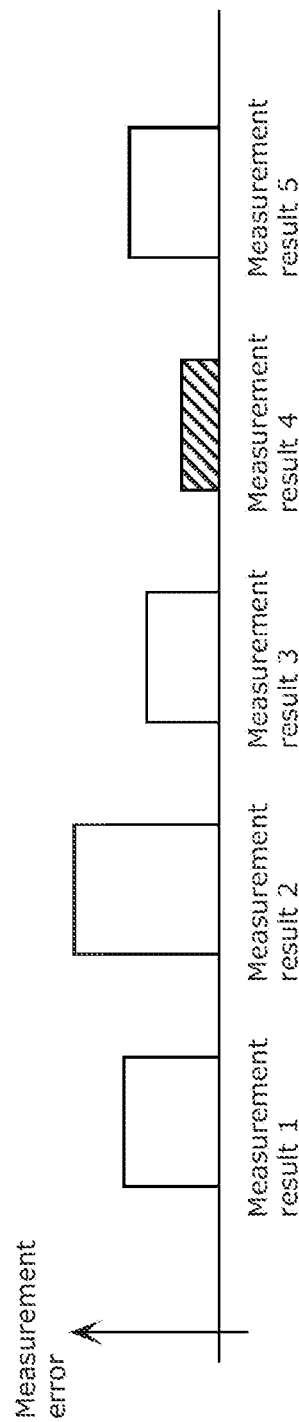

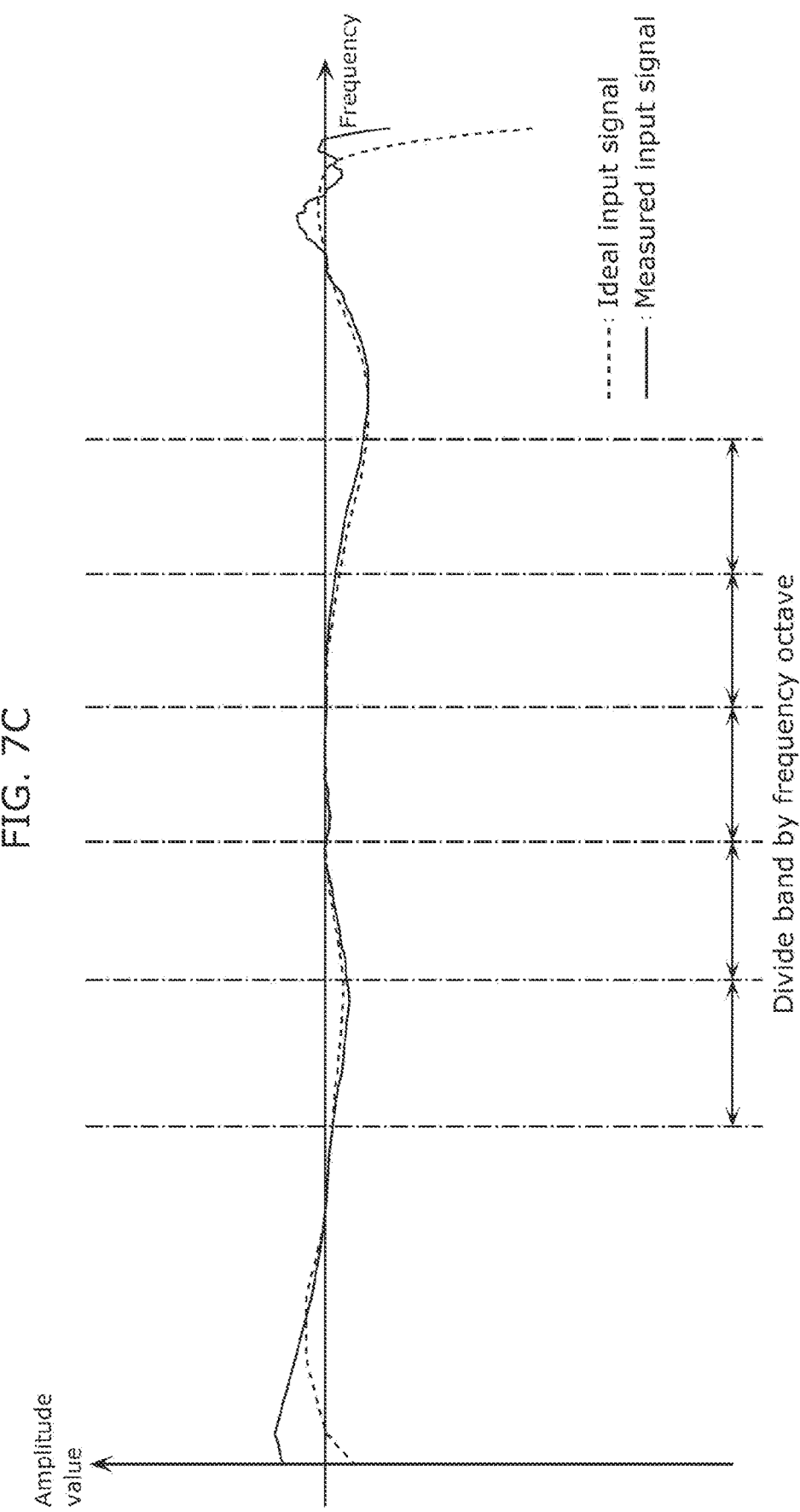

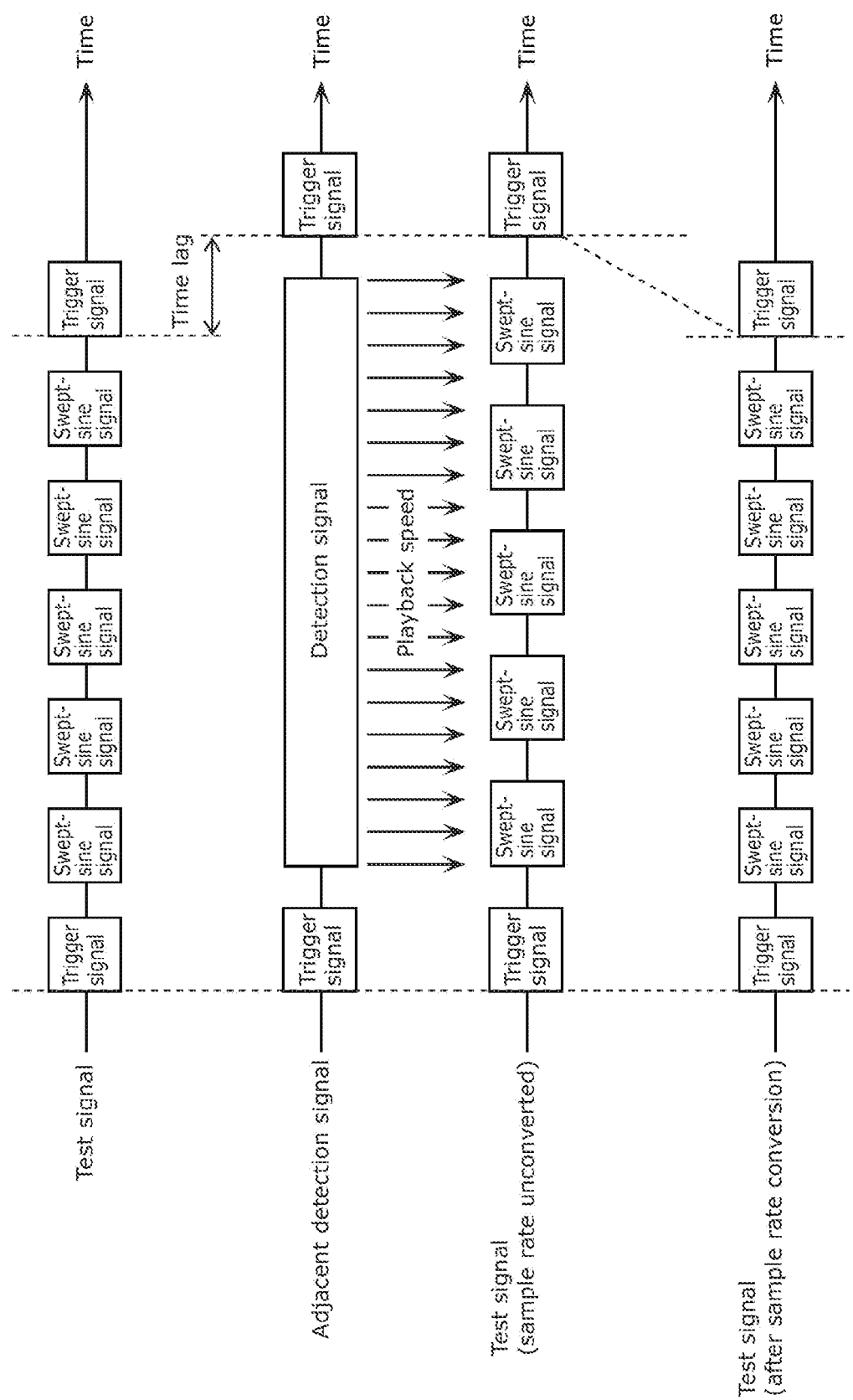

MEASUREMENT DEVICE, MEASUREMENT METHOD, RECORDING MEDIUM, AND PHONOGRAPH RECORD

CROSS-REFERENCE OF RELATED APPLICATIONS

This application is the U.S. National Phase under 35 U.S.C. § 371 of International Patent Application No. PCT/JP2020/041626, filed on Nov. 6, 2020, which in turn claims the benefit of Japanese Patent Application No. 2020-083084, filed on May 11, 2020, the entire disclosures of which applications are incorporated by reference herein.

TECHNICAL FIELD

The present disclosure relates to a measurement device, a measurement method, a recording medium, and a phonograph record for measuring various characteristics of a pickup cartridge (hereinafter, also referred to as a cartridge) in a record playback system or a transmission passage between a turntable system and a phono equalizer.

BACKGROUND ART

Patent Literature (PTL) 1 discloses a technique for measuring the characteristics of a record playback system that changes depending on various characteristics of a cartridge or the like by using a phonograph record on which a raised cosine pulse waveform having a short pulse width is recorded. Specifically, the characteristics of the record playback system are frequency characteristics (frequency amplitude characteristics, frequency phase characteristics, and the like) of an input signal input from a record player to a playback device including a phono equalizer, an amplifier, and the like.

CITATION LIST

Patent Literature

[PTL 1] Japanese Examined Patent Application Publication No. S58-33605

SUMMARY OF INVENTION

Technical Problem

However, in the technique disclosed in PTL 1, in the measurement of the characteristics of a record playback system using a raised cosine pulse waveform having a short pulse width, it is easily affected by disturbance factors such as scratch noise and it is difficult to measure with a good S/N ratio. On the other hand, in order to perform a measurement with a good S/N ratio, it is conceivable to use a swept-sine (SS) signal such as a time stretched pulse (TSP) signal obtained by stretching the impulse signal in the time direction. However, when the SS signal is applied to the phonograph record, the original characteristics may not be measured due to the influence caused by the record player and the phonograph record.

The present disclosure provides a measurement device or the like capable of effectively measuring the characteristics of a record playback system.

Solution to Problem

The measurement device in the present disclosure is a measurement device included in a record playback system including a record player, the measurement device including: a processor; and a memory, wherein the processor, by executing a program stored in the memory: measures frequency characteristics of a plurality of input signals which are input from the record player to the measurement device when a plurality of test signals for measuring the characteristics of the record playback system are played back by the record player, the plurality of test signals being recorded on a phonograph record, the plurality of input signals corresponding to the plurality of test signals recorded; calculates a measurement error between each of the frequency characteristics of the plurality of input signals measured and a predetermined frequency characteristic; selects a frequency characteristic of which the measurement error is smallest from among the frequency characteristics of the plurality of input signals, as a measurement result of the record playback system; and outputs the measurement result selected.

The measurement method in the present disclosure includes processes of measuring a frequency characteristic of each of a plurality of input signals which are input from a record player when a plurality of test signals for measuring the characteristic of a record playback system are played back by the record player in the record playback system, the plurality of test signals being recorded on a phonograph record, the plurality of input signals corresponding to the plurality of test signals recorded; calculating a measurement error between each of the frequency characteristics of the plurality of input signals measured and a predetermined frequency characteristic; selecting a frequency characteristic of which the measurement error is smallest from among the frequency characteristics of the plurality of input signals, as a measurement result of the record playback system; and outputting the measurement result selected.

The recording medium in the present disclosure is a non-transitory computer-readable recording medium having recorded thereon a program for causing a computer to execute the measurement method described above.

The phonograph record in the present disclosure has a plurality of test signals for measuring characteristics of a record playback system recorded in a sound groove within one lap.

Advantageous Effects of Invention

According to the measurement device or the like in the present disclosure, the characteristics of the record playback system can be effectively measured.

BRIEF DESCRIPTION OF DRAWINGS

FIG. 5 is a flowchart showing an example of the operation of the measurement device according to the embodiment.

FIG. 7A is a diagram for explaining a method of calculating a measurement error between each of the frequency characteristics of a plurality of input signals and a predetermined frequency characteristic.

FIG. 7B is a diagram for explaining a method of selecting a measurement result.

FIG. 7C is a diagram for explaining a specific example of a method of selecting a measurement result.

FIG. 8 is a diagram for explaining the conversion of the sample rate.

DESCRIPTION OF EMBODIMENTS

Hereinafter, embodiments will be described in detail with reference to the drawings as appropriate. However, more detailed explanation than necessary may be omitted. For example, detailed explanations of already well-known matters and duplicate explanations for substantially the same configuration may be omitted. This is to avoid unnecessary redundancy of the following description and to facilitate the understanding of those skilled in the art.

The inventor intends to provide the accompanying drawings and the following description for those skilled in the art to fully understand the present disclosure, and these are not intended to limit the subject matter described in the claims

Embodiment

Hereinafter, embodiments will be described with reference to FIG. 1 to FIG. 8.

Figure 1:
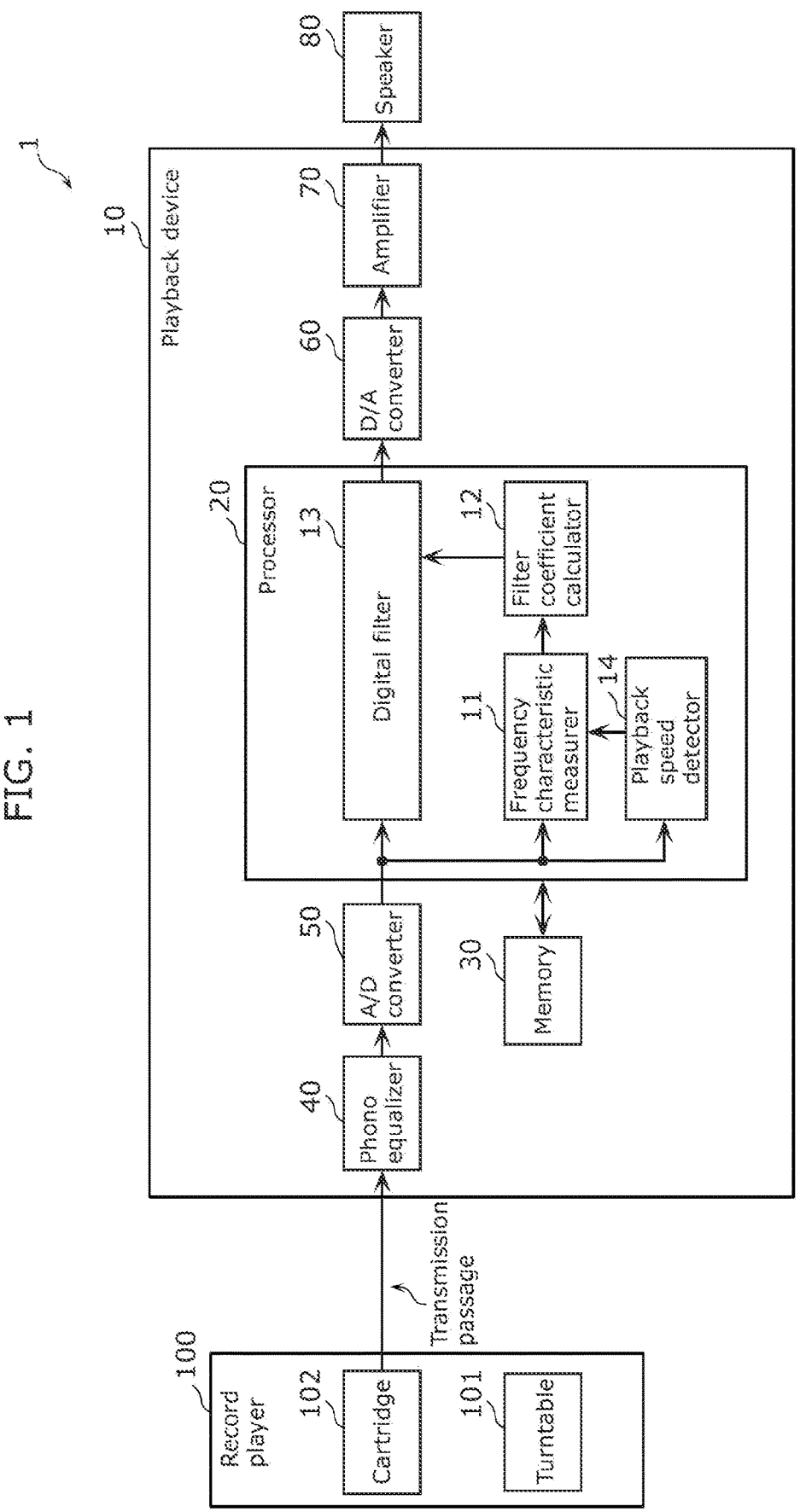
FIG. 1 is a diagram showing an example of a configuration of a record playback system according to an embodiment.

FIG. 1 is a diagram showing an example of the configuration of record playback system 1 according to the embodiment.

Record playback system 1 is a system for playing back an analog record, and includes record player 100, playback device 10, and speaker 80.

Record player 100 is an acoustic device for playing back a signal (for example, an audio signal and the like) recorded on a phonograph record, and includes turntable 101 and cartridge 102.

Turntable 101 is a rotary table on which a phonograph record is placed and rotates (specifically, rotates on its axis) at a constant speed.

Cartridge 102 is a pickup cartridge provided at the tip of a tone arm (not shown) and including a record needle that traces the sound groove of a phonograph record mounted on turntable 101. The cartridge has various configurations such as a moving magnet type or a moving coil type depending on its structure. Such a cartridge acquires a signal recorded in the sound groove of a phonograph record as vibration through a record needle, generates a voltage by vibrating a magnet or a coil due to the acquired vibration, converts it into an analog electric signal, and output it. In the present embodiment, cartridge 102 will be described as, for example, a moving magnet type cartridge.

Speaker 80 converts the electric power of the signal output from amplifier 70 described later into acoustic energy and outputs the sound to the space.

Playback device 10 is a device that adjusts and amplifies the frequency characteristics of the input signal input from record player 100 that plays back the phonograph record, and includes processor 20, memory 30, phono equalizer 40, and A/D converter 50, D/A converter 60, and amplifier 70. Playback device 10 is an example of a measurement device.

Phono equalizer 40 is an equalizer that corrects the frequency amplitude characteristic of the electric signal output from cartridge 102 to a flat characteristic. Normally, a phonograph record is subjected to emphasis processing on the frequency at the time of cutting in order to effectively utilize the dynamic range. If the frequency characteristics of the sound source are not corrected and cutting is performed as they are, the amplitude becomes large in the low frequency range. For this reason, the amplitude limit of the cutter head is exceeded during cutting, and tracing during playback becomes difficult. On the other hand, in the high frequency range, the amplitude becomes small, so that the S/N ratio decreases. Therefore, the sound groove of the phonograph record is corrected in advance so that the low frequency signal level is small and the high frequency signal level is high, and then cutting is performed. A characteristic curve defined by the Recording Industry Association of America (RIAA) is generally used for this correction. At the time of playback, the frequency characteristic is restored to the original flat characteristic by performing correction with a curve having the opposite characteristic to the above characteristic curve.

A/D converter 50 is a converter that converts an electric signal (analog signal) output from phono equalizer 40 into a digital signal. A/D converter 50 outputs a digital signal.

D/A converter 60 is a converter that converts a signal (digital signal) whose frequency characteristics have been adjusted by digital filter 13 described later into an analog signal. D/A converter 60 outputs an analog signal.

Amplifier 70 is an amplifier that amplifies the analog signal output from D/A converter 60. Amplifier 70 may be, for example, a class D amplifier or the like.

Due to the characteristics (for example, an impedance mismatch and the like) of cartridge 102 included in record player 100, the load connected to cartridge 102 (for example, playback device 10, specifically, phono equalizer 40), and the transmission passage connecting cartridge 102 and the load, the characteristics of record playback system 1, specifically, the frequency characteristics of the input signal input from record player 100 to playback device 10 fluctuate. This will be described with reference to FIG. 2.

Figure 2:
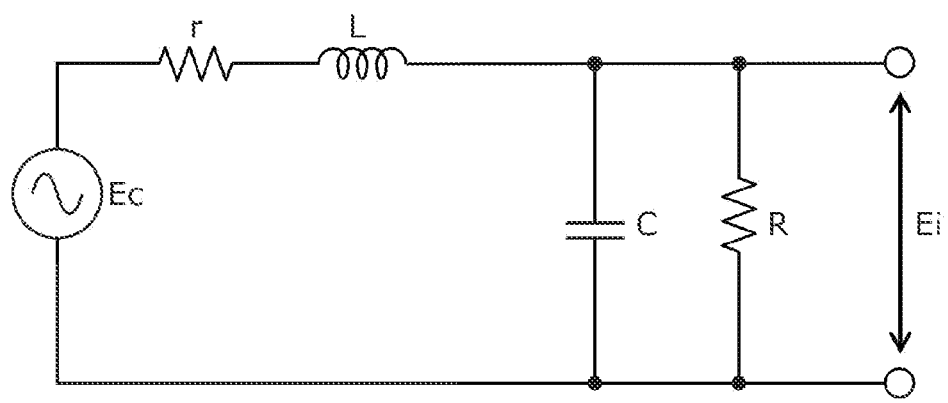
FIG. 2 is a circuit diagram showing an example of an equivalent circuit of a load and a transmission passage connecting a cartridge and the load in a moving magnet type cartridge.

FIG. 2 is a circuit diagram showing an example of an equivalent circuit of a load and a transmission passage connecting cartridge 102 and the load in moving magnet type cartridge 102.

The input signal (input voltage Ei) to playback device 10 is a value corresponding to open output voltage Ec of cartridge 102, DC resistance r of cartridge 102, inductance L of cartridge 102, stray capacitance C of the transmission passage, and load resistance R, that is, the frequency characteristics of the input signal to playback device 10 fluctuate according to these characteristics.

Playback device 10 is also a device that measures the characteristics of record playback system 1, and specifically, it measures the fluctuation of the frequency characteristics of the input signal to playback device 10 due to cartridge 102 included in record player 100, the load connected to cartridge 102, and the characteristics of the transmission passage connecting cartridge 102 and the load as mentioned above. Playback device 10 may also have a function of correcting the frequency characteristics according to the fluctuation. The function of measuring the characteristics of record playback system 1 and the function of correcting the frequency characteristics of playback device 10 are realized by frequency characteristic measurer 11, filter coefficient calculator 12, digital filter 13, and playback speed detector 14. Details of frequency characteristic measurer 11, filter coefficient calculator 12, digital filter 13, and playback speed detector 14 will be described later.

When playback device 10 measures the characteristics of record playback system 1, a phonograph record for measuring the characteristics of record playback system 1 and not for listening enjoyment is placed on turntable 101 and test signals recorded on the phonograph record for measurement are played back. The test signal is an SS signal such as a TSP signal. The SS signal is a signal whose energy is relatively increased by stretching the impulse signal in the time direction. In the SS signal, the frequency changes with time from low frequency to high frequency or from high frequency to low frequency. By using the SS signal, it is possible to perform measurement with a high S/N ratio.

However, when the SS signal is applied to the phonograph record for measurement, it is affected by record player 100 and the phonograph record when measuring the characteristics of record playback system 1. For example, there is an effect of the warp of the phonograph record that the tone arm vibrates up and down due to the warp of the phonograph record, so that an appropriate stylus pressure is not applied to the record needle, and the record needle moves away from the phonograph record, so that the sound groove cannot be traced accurately and open output voltage Ec of cartridge 102 changes. For example, there is an effect of a change in the radius that the line speed changes due to the positional deviation of the center hole of the phonograph record (positional deviation of the center of the phonograph record) or the change in the radius of the phonograph record due to the track feed during the production of the phonograph record (during cutting), and the playback speed of the sound source changes. For example, there is an effect of the rotation speed deviation that the playback speed changes due to the rotation speed deviation of turntable 101. In this way, when the SS signal is applied to the phonograph record, there is a problem that it is difficult to accurately measure the input signal due to the effects peculiar to record player 100 and the phonograph record. In order to solve this problem, phonograph record 200 and playback device 10 are used in the present disclosure. Phonograph record 200 will be described with reference to FIG. 3A to FIG. 4B.

Figure 3A:
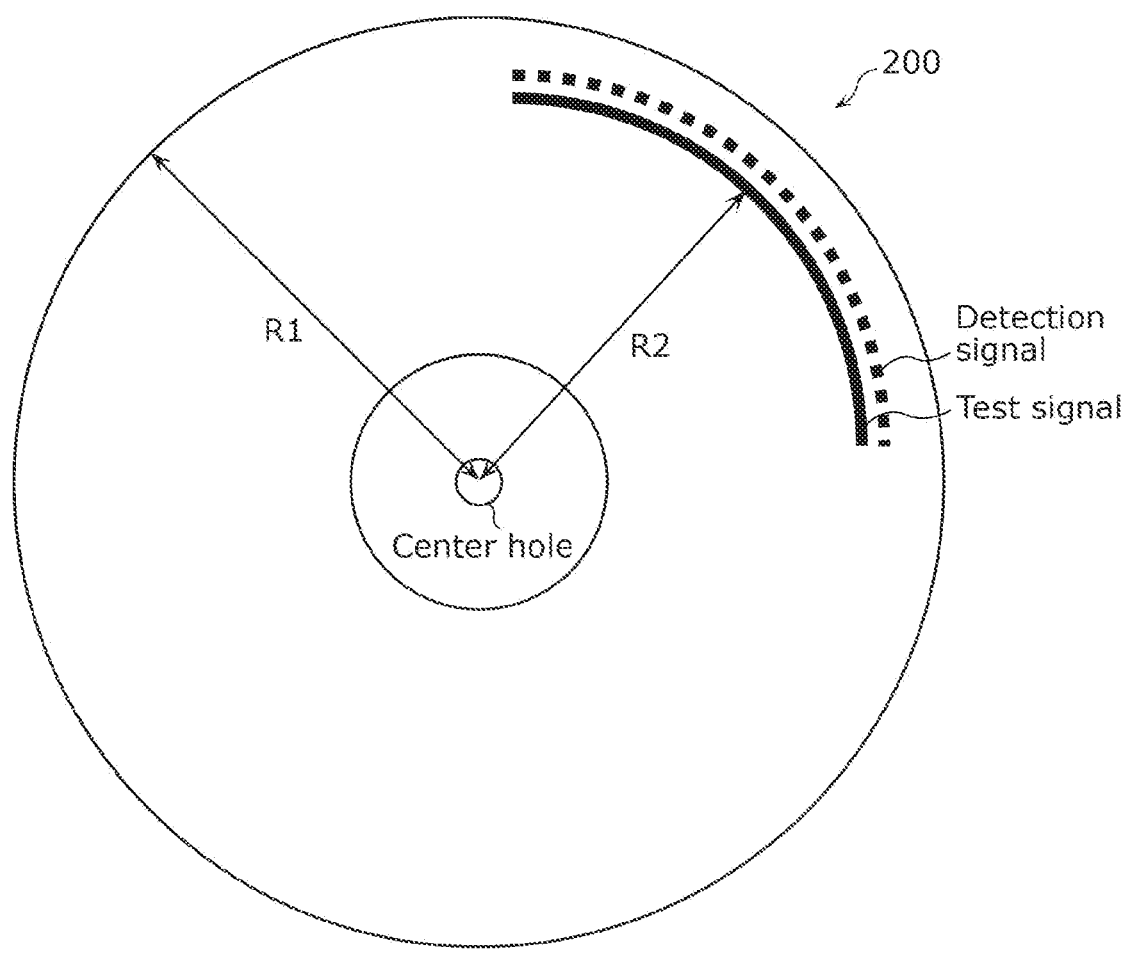
FIG. 3A is a top view showing an example of a phonograph record according to the embodiment.

FIG. 3A is a top view showing an example of phonograph record 200 according to the embodiment.

Figure 3B:
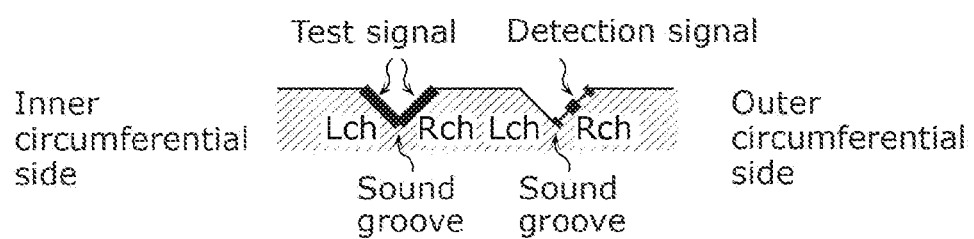
FIG. 3B is a cross-sectional view showing an example of sound grooves in which a test signal and a detection signal for detecting a playback speed are recorded.

FIG. 3B is a cross-sectional view showing an example of sound grooves in which a test signal and a detection signal for detecting a playback speed are recorded.

Phonograph record 200 is a phonograph record dedicated to the measurement of the characteristics of record playback system 1, and a plurality of test signals for measuring the characteristics of record playback system 1 are recorded (a test signal for measuring the characteristics of record playback system 1 is recorded a plurality of times) in the sound groove. Each of the test signals recorded a plurality of times is the same signal, and is an SS signal such as a TSP signal. On phonograph record 200, a test signal for measuring a characteristic of record playback system 1 is recorded a plurality of times in the sound groove within one lap. This is because when the test signal is recorded a plurality of times in the sound groove of one lap or more, interference occurs between the sound grooves adjacent to each other in the radial direction of phonograph record 200 when the track pitch at the time of cutting is small, and the S/N ratio may deteriorate. FIG. 3A shows an example in which a test signal is recorded a plurality of times in a sound groove of about ¼ lap. In this way, by recording the test signal a plurality of times in the sound groove within one lap, the deterioration of the S/N ratio can be suppressed.

The test signal is recorded on phonograph record 200 a plurality of times in the sound groove in the outer circumferential region of phonograph record 200. This is because turntable 101 rotates at a constant rotation speed (for example, 331/3 rpm) in the turntable system, so that the linear velocity is slow in the inner circumferential region of phonograph record 200, and the S/N ratio becomes worse when the test signal is recorded in the sound groove in the inner circumferential region of phonograph record 200. The sound groove in the outer circumferential region of phonograph record 200 is a sound groove at a position separated from the center of phonograph record 200 toward the outer circumferential direction of phonograph record 200 by more than half of the radius of phonograph record 200. FIG. 3A shows that R2, which is the distance from the center of phonograph record 200 to the sound groove in which the test signal is recorded, is larger than half of R1 which is the radius of phonograph record 200, and a test signal such as an SS signal is recorded a plurality of times in the sound groove at the position of R2.

On phonograph record 200, a detection signal for detecting the playback speed on phonograph record 200 is recorded at a position adjacent at the outer circumferential side or the inner circumferential side of phonograph record 200 with respect to the position of the sound groove in which the test signal is recorded a plurality of times. For example, the detection signal is a single frequency sine wave signal, and is recorded so as to have a known frequency (for example, 1 kHz) when phonograph record 200 is played back at a known rotation speed such as 331/3 rpm, so that the period of the sine wave signal can be calculated in advance. For this reason, the playback speed can be obtained by comparing the time interval between the zero cross points (corresponding to a half period of a sine wave) when phonograph record 200 is played back at an unknown rotation speed with the period of the pre-calculated sine wave when phonograph record 200 is played back at a known rotation speed. For example, by using the number of samples between adjacent zero cross points of a sine wave signal when phonograph record 200 is played back at an unknown rotation speed and the number of samples (for example, stored in advance in a memory or the like) between adjacent zero cross points of the sine wave signal when phonograph record 200 is played back at a known rotation speed, the sample rate conversion rate is calculated and the sample rate conversion is performed. The test signal is recorded a plurality of times at a position adjacent to the position of the sound groove in which the detection signal is recorded. The change in the playback speed due to the change in the radius of the phonograph record due to the positional deviation of the center hole of the phonograph record, or the change in the radius of the phonograph record due to the track feed during cutting of the phonograph record can be regarded as equal between the adjacent sound grooves. For this reason, by detecting the playback speed (number of samples) in the sound groove in which the detection signal is recorded on phonograph record 200, it is possible to measure the playback speed at the sound groove in which the test signal is recorded which is adjacent to the sound groove in which the detection signal is recorded.

FIG. 3A and FIG. 3B show an example in which a detection signal is recorded in a sound groove adjacent at the outer circumferential side of phonograph record 200 with respect to a sound groove in which the test signal is recorded a plurality of times. In this case, the detection signal is recorded in the channel on the outer circumferential side (right channel (referred to as Rch in the drawing)) of the sound groove. Generally, the right channel of the sound groove is located on the outer circumferential side of the phonograph record, and the left channel (referred to as Lch in the drawing) of the sound groove is located on the inner circumferential side of the phonograph record. When the detection signal is recorded in the sound groove adjacent at the outer circumferential side of phonograph record 200 with respect to the sound groove in which the test signal is recorded a plurality of times, the right channel is farther away from the test signal than the left channel in the sound groove in which the detection signal is recorded. For this reason, the influence of the detection signal on the test signal can be suppressed, and the deterioration of the S/N ratio can be suppressed.

On phonograph record 200, a detection signal for detecting a playback speed on phonograph record 200 may be recorded in a sound groove adjacent at the inner circumferential side of phonograph record 200 with respect to the sound groove in which the test signal is recorded a plurality of times. This will be described with reference to FIG. 4A and FIG. 4B.

Figure 4A:
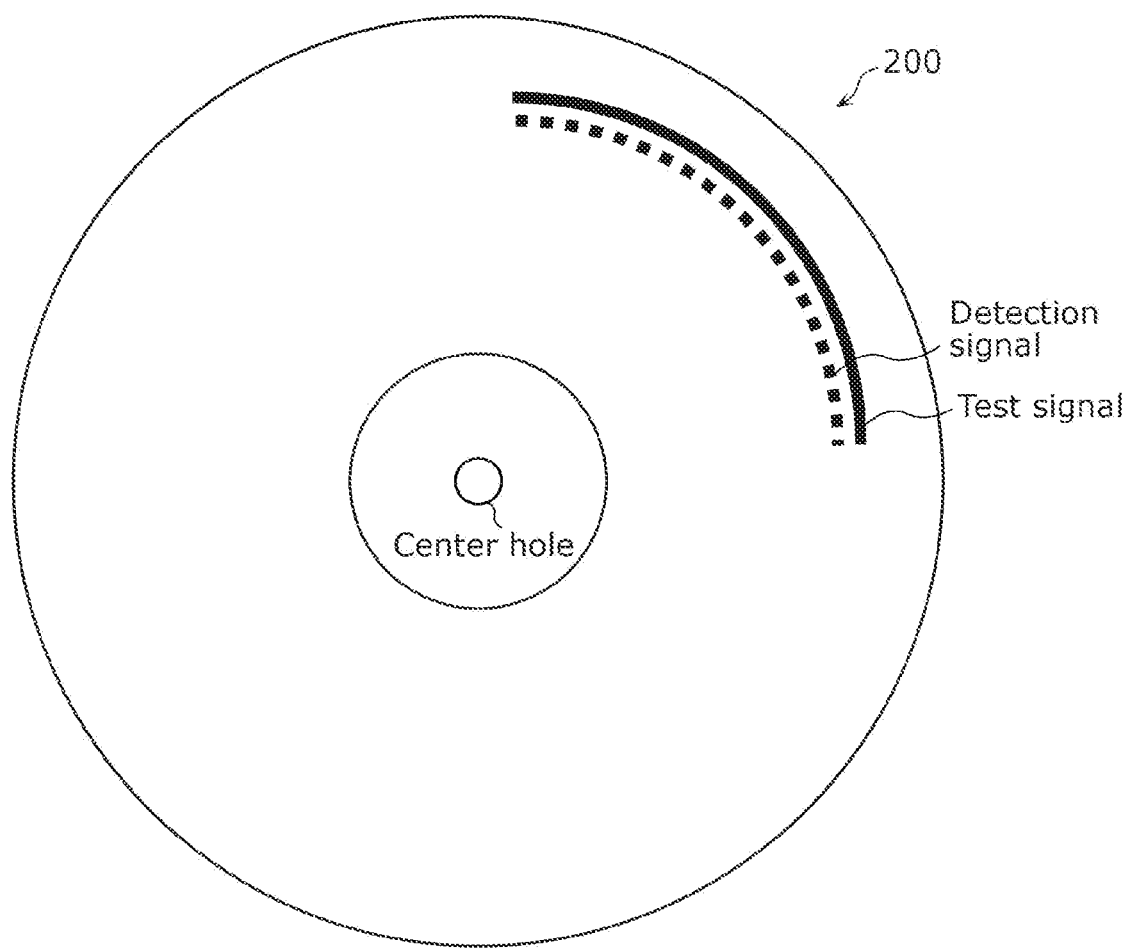
FIG. 4A is a top view showing another example of a phonograph record according to the embodiment.

FIG. 4A is a top view showing another example of phonograph record 200 according to the embodiment.

Figure 4B:
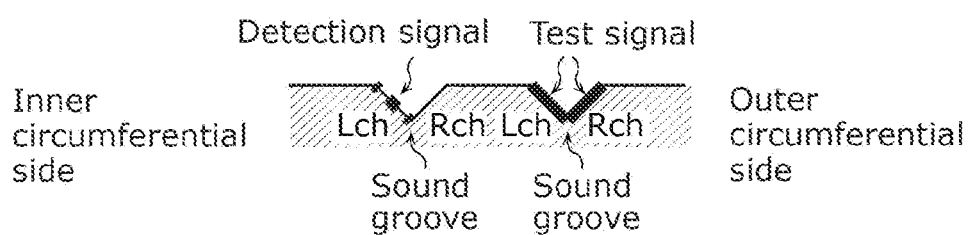
FIG. 4B is a cross-sectional view showing another example of sound grooves in which a test signal and a detection signal for detecting a playback speed are recorded.

FIG. 4B is a cross-sectional view showing another example of the sound grooves in which the test signal and the detection signal for detecting the playback speed are recorded.

FIG. 4A and FIG. 4B show an example in which a detection signal is recorded in a sound groove adjacent at the inner circumferential side of phonograph record 200 with respect to the sound groove in which the test signal is recorded a plurality of times. In this case, the detection signal is recorded in the channel on the inner circumferential side (left channel) of the sound groove. When the detection signal is recorded in the sound groove adjacent at the inner circumferential side of phonograph record 200 with respect to the sound groove in which the test signal is recorded a plurality of times, the left channel is farther away from the sound groove in which the test signal is recorded than the right channel in the sound groove in which the detection signal is recorded. Accordingly, the influence of the detection signal on the test signal can be suppressed, and the deterioration of the S/N ratio can be suppressed.

When the detection signal is recorded in the sound groove adjacent at the outer circumferential side of phonograph record 200 with respect to the sound groove in which the test signal is recorded a plurality of times, the detection signal can be played back before the test signal, so that it is possible to determine the sample rate conversion rate first, then play the test signal, and the sample rate conversion can be performed in real time. For this reason, the case where the detection signal is recorded in the sound groove adjacent at the outer circumferential side is more preferable than the case where the detection signal is recorded in the sound groove adjacent at the inner circumferential side of phonograph record 200 with respect to the sound groove in which the test signal is recorded a plurality of times. When the detection signal is recorded in the sound groove adjacent at the inner circumferential side of phonograph record 200 with respect to the sound groove in which the test signal is recorded a plurality of times, the test signal is once played back and stored in a memory or the like, the detection signal is then played back, the sample rate conversion rate is determined, and the sample rate conversion is performed.

The test signal and the detection signal may be recorded so as to face each other on the right channel and the left channel of the same sound groove. However, as shown in FIG. 3A to FIG. 4B, it is desirable from the viewpoint of measurement accuracy that the test signal and the detection signal are recorded in different sound grooves (tracks) with a difference of one lap.

Next, the details of frequency characteristic measurer 11, filter coefficient calculator 12, digital filter 13, and playback speed detector 14 will be described.

Playback device 10 is a computer having processor 20 (for example, a digital signal processor (DSP)), memory 30, and the like. The memory includes a read only memory (ROM), a random access memory (RAM), and the like, and can store a program executed by the processor. Frequency characteristic measurer 11, filter coefficient calculator 12, digital filter 13, and playback speed detector 14 are realized by processor 20 or the like that executes a program stored in memory 30.

When the test signal for measuring a characteristic of record playback system 1 recorded on phonograph record 200 a plurality of times is played back by record player 100, frequency characteristic measurer 11 performs the sample rate conversion of the test signal based on the playback speed of the test signal detected by playback speed detector 14 to convert it into a test signal with no deviation in the playback speed. After that, Frequency characteristic measurer 11 measures the frequency characteristics of a plurality of input signals corresponding to the test signal recorded a plurality of times input from record player 100 to playback device 10; calculates a measurement error between each of the frequency characteristics of the plurality of input signals measured and a predetermined frequency characteristic; selects a frequency characteristic of which the measurement error is smallest from among the frequency characteristics of the plurality of input signals, as a measurement result of record playback system 1; and outputs the measurement result selected. The details of frequency characteristic measurer 11 will be described later with reference to FIG. 5 to FIG. 7C.

Filter coefficient calculator 12 calculates the filter coefficient of digital filter 13 based on the measurement result output from frequency characteristic measurer 11. For example, when the frequency characteristic indicated by the measurement result for the desired frequency characteristic is too high or too low at a specific frequency, such a filter coefficient that the frequency characteristic indicated by the measurement result approaches the desired frequency characteristic is calculated. Filter coefficient calculator 12 outputs the calculated filter coefficient to digital filter 13.

Digital filter 13 is a filter that adjusts the frequency characteristics of the input signal input from record player 100 to playback device 10 according to the filter coefficient calculated by filter coefficient calculator 12. For example, digital filter 13 is a finite impulse response (FIR) filter.

Playback speed detector 14 detects the playback speed at the position where the test signal on phonograph record 200 is recorded a plurality of times based on the detection signal recorded on phonograph record 200. For the detection signal, for example, a 1 kHz sine wave is used. Playback speed detector 14 calculates the half period time of the sine wave for each zero cross point of the sine wave, and compares it with the known period of the sine wave to detect the time lag. The details of playback speed detector 14 will be described later with reference to FIG. 8.

FIG. 5 is a flowchart showing an example of the operation of playback device 10 (specifically, frequency characteristic measurer 11) according to the embodiment. For example, after the user places phonograph record 200 on turntable 101 of record player 100 and starts playing back the test signal recorded on phonograph record 200 a plurality of times, playback device 10 performs the operation shown in FIG. 5.

Playback device 10 measures the frequency characteristic of the plurality of the input signals according to the test signal recorded a plurality of times, which are input from record player 100 to playback device 10 at the time when the test signal recorded on phonograph record 200 a plurality of times is played back by record player 100 (step S11). This will be described with reference to FIG. 6.

Figure 6:
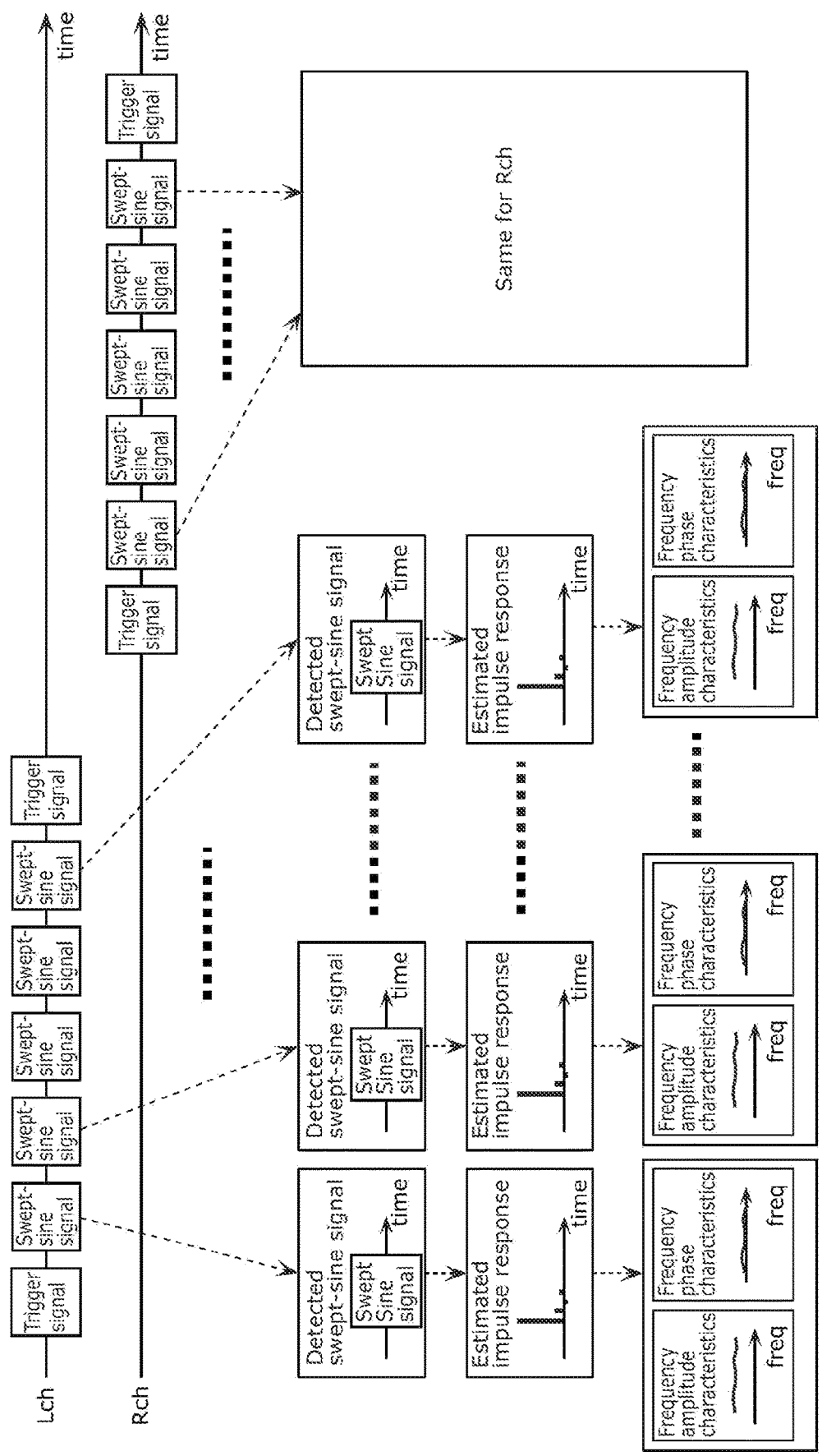
FIG. 6 is a diagram for explaining a measurement method of frequency characteristics of a plurality of input signals.

FIG. 6 is a diagram for explaining a method of measuring the frequency characteristics of a plurality of input signals.

As shown in FIG. 6, for example, it is assumed that five test signals (SS signals) are recorded on the left channel of the sound groove of phonograph record 200 and five test signals are recorded on the right channel. As shown in FIG. 6, a trigger signal may be recorded in the sound groove of phonograph record 200. The trigger signal can recognize the start and end timings of the test signal on phonograph record 200. An example is shown in which first the test signal recorded on the left channel is measured, then the test signal recorded on the right channel is measured, but first the test signal recorded on the right channel may be measured, and then the test signal recorded on the right channel may be measured. The test signals may be recorded on the right channel and the left channel facing each other in the sound groove, and the test signal recorded on the right channel and the test signal recorded on the left channel may be measured at the same time.

Playback device 10 extracts the test signal from each of a plurality of input signals corresponding to the test signal recorded a plurality of times, which are input to playback device 10 from record player 100 that plays back the test signal recorded a plurality of times on phonograph record 200. At that time, playback device 10 performs sample rate conversion of the extracted test signal based on the playback speed of the test signal detected by playback speed detector 14, and converts them into a test signal having no deviation of the playback speed. Playback device 10 estimates an impulse response that combines the input impedances of cartridge 102, the transmission passage, and the load by performing a convolution operation between the test signal cut on phonograph record 200 for measurement and a signal that is the complex conjugate of the test signal (for example, the inverse TSP signal) for the test signal after the sample rate conversion. Playback device 10 acquires frequency characteristics (specifically, a frequency amplitude characteristic and a frequency phase characteristic) by performing a fast Fourier transform (FFT) on the estimated impulse response. Playback device 10 performs the above processing in the same manner for each of the test signals recorded a plurality of times on phonograph record 200, and acquires each frequency characteristic. At this time, due to the influence caused by record player 100 and phonograph record 200 as mentioned above, a measurement error may occur in the measurement results of any of the test signals recorded a plurality of times. However, in the present disclosure, since the test signal is recorded a plurality of times on phonograph record 200, it is possible to reduce the influence of the measurement error by selecting and adopting the frequency characteristic having a small measurement error.

Returning to the description in FIG. 5, playback device 10 next calculates the measurement error between each of the frequency characteristics of the plurality of input signals measured and the predetermined frequency characteristic (step S12). For example, in the example of moving magnet type cartridge 102 of FIG. 2, in the equivalent circuit of cartridge 102, the load, and the transmission passage connecting cartridge 102 and the load, a peak occurs in the frequency amplitude characteristic at the resonance frequency of the circuit determined by the inductance of cartridge 102, the stray capacitance of the transmission passage, and the load resistance, but it is expected that the frequency characteristic becomes flat in other frequency bands. In moving magnet type cartridge 102, the resonance frequency of the circuit is generally generated between about 5 kHz and 20 kHz. Therefore, if the frequency characteristic is not flat in a frequency band other than the resonance frequency, it can be considered that an error has occurred during the measurement. Based on such a characteristic, playback device 10 calculates the measurement error in the band other than the resonance frequency from the frequency characteristic results acquired from the test signals recorded a plurality of times, and selects a frequency characteristic having the smallest measurement error as the measurement result of record playback system 1 (step S13). This will be described with reference to FIG. 7A and FIG. 7B.

FIG. 7A is a diagram for explaining a method of calculating a measurement error between each of the frequency characteristics of a plurality of input signals and a predetermined frequency characteristic. The upper side of FIG. 7A shows a plurality of input signals corresponding to the test signals recorded a plurality of times input from record player 100 to playback device 10, and the lower side of FIG. 7A shows the frequency characteristics (here, as an example, the frequency amplitude characteristic) of the plurality of input signals.

FIG. 7B is a diagram for explaining a method of selecting a measurement result.

For example, five input signals are shown on the upper side of FIG. 7A. The five input signals correspond to the five test signals recorded on phonograph record 200. Since the five test signals recorded on phonograph record 200 are the same signals, ideally, the five input signals also have the same waveform. However, it can be seen that, for example, due to the influence of the warp of phonograph record 200, the waveform of the second input signal from the left is significantly different from the waveforms of other input signals. Correspondingly, as shown in the lower side of FIG. 7A, it can be seen that the second frequency amplitude characteristic from the left (measurement result 2) is significantly different from other frequency amplitude characteristics.

The predetermined frequency characteristics are frequency characteristics (a frequency amplitude characteristic and a frequency phase characteristic) of the input signal from record player 100 that plays back the test signal to playback device 10, which is assumed when not affected by record player 100 and phonograph record 200. That is, the predetermined frequency characteristic is the frequency characteristic of the ideal input signal input to playback device 10 when record player 100 plays back the test signal. For example, when there is a change in the frequency characteristic different from the peak dip of the frequency amplitude characteristic caused by the input impedance of cartridge 102, the transmission passage, and the load, the measurement error between the frequency characteristic of the input signal from record player 100 that plays back the test signal to playback device 10 and the predetermined frequency characteristic becomes large. Playback device 10 calculates the measurement error between each of the five frequency amplitude characteristics and the predetermined frequency amplitude characteristic as shown in FIG. 7B, and the frequency amplitude characteristic having the smallest measurement error (measurement result 4) among the five frequency amplitude characteristics is selected as the measurement result of record playback system 1. Here, a specific example of the method of selecting the measurement result will be described with reference to FIG. 7C.

FIG. 7C is a diagram for explaining a specific example of the method of selecting the measurement result.

Playback device 10 divides the band into frequency octaves (for example, every octave) with respect to the frequency amplitude characteristics (solid line), for example, measured as shown in FIG. 7C, and calculates the error with the frequency characteristics (broken line) of the ideal input signal. Playback device 10 calculates the summation of the error of each octave, and among the measurement results of the plurality of input signals acquired from the test signals recorded a plurality of times, the input signal having the smallest summation of the error is selected as the measurement result. FIG. 7C shows an example in which the measurement result is selected by paying attention to the amplitude characteristic, but the measurement result may be selected by paying attention to the phase characteristic in the same manner.

Due to the effects of the deviation of the rotation speed of turntable 101, the playback speed of the test signal may change and the measurement error may increase, but in the present disclosure, these effects can be cancelled out by the sample rate conversion using the detection signal. This will be described with reference to FIG. 8.

FIG. 8 is a diagram for explaining the conversion of the sample rate.

For example, as shown in the upper part and the center of FIG. 8, there is a time lag until the playback of the five recorded test signals is completed between the case where the playback speed changes and the case where the playback speed does not change. Then, the sample rate conversion using the detection signal adjacent to the test signal as shown in the center of FIG. 8 can cancel out such a time lag as shown in the lower part of FIG. 8, and the playback speed can be returned to the original playback speed. On phonograph record 200, as shown in FIG. 4A, the detection signal and the test signal are recorded on the adjacent sound grooves with a difference of one lap so that the recording start position (angle) of the detection signal and the recording start position of the test signal are the same, and that the recording end position (angle) of the detection signal and the recording end position of the test signal are the same. For this reason, the sample rate conversion rate obtained from the detection signal can be associated with the test signal.

For example, a sine wave signal is used as the detection signal, and the number of samples ($N_i$ (i is a natural number)) for each time interval (half period of the sine wave signal) of the zero crossing point of the detection signal is calculated from the change in the amplitude of the detection signal. The number of samples for each half period of the detection signal is associated with the position corresponding to the detection signal from the recording start position to the recording end position of the test signal. For example, by arranging the trigger signals at the beginning and the end of each of the detection signal and the test signal, the number of samples is associated based on each position of the trigger signals. The trigger signal may not be arranged, and for example, the association may be made based on the timing at which the signal starts to be detected from the mute state.

Ideal sample number M for each half period of the detection signal in the case that the playback speed does not change is recorded as known, for example, in a memory or the like, and the sample rate conversion is performed at conversion rate $M/N_i$ in the section of the test signal corresponding to each half period of the detection signal. For example, when the ideal number of samples M is 100, while $N1=110$ and $N2=100$, the sample rate conversion is performed at a conversion rate of $M/N1=100/110$ for the first section of the test signal (that is, the section of the test signal corresponding to the half period in the detection signal immediately after the trigger signal). Accordingly, this section becomes 100 samples, which can be converted into an ideal number of samples. That is, the sample rate conversion is performed so that the original playback speed is obtained for this section. In the next section, $N2=100$, the conversion rate is $M/N2=100/100$, and the sample rate conversion is not performed. After that, the sample rate conversion is similarly applied to each section corresponding to the half period of the detection signal. Since the time interval of the zero cross point can be obtained for each half period of the sine wave, the playback speed (that is, the number of samples) can also be obtained for each half period of the sine wave. By converting the sample rate according to the acquired playback speed, it is possible to accurately return to the original number of data without any deviation in the playback speed. In order to shorten the calculation time, the sample rate may be converted using the average value of a plurality of periods instead of the half period of the sine wave.

It is also possible to simplify the sample rate conversion. For example, the number of samples when the detection signal is played back from the beginning to the end may be N, the ideal number of samples at this time may be M, and the entire test signals may be sample rate converted at a conversion rate of M/N. In this case, the detection signal may be any signal whose amplitude can be detected, and may be white noise, a pulse signal, or the like. The detection signal may be mute (no signal) in addition to the detection signal that can be selected when the trigger signal is not arranged.

Returning to the explanation in FIG. 5, playback device 10 then outputs the selected measurement result (step S14). Accordingly, filter coefficient calculator 12 can calculate the filter coefficient of digital filter 13 based on the frequency characteristics that are less affected by record player 100 and phonograph record 200.

As described above, playback device 10 in record playback system 1 including record player 100 and playback device 10 includes processor 20 and memory 30, wherein by executing a program stored in memory 30, processor 20 measures frequency characteristics of a plurality of input signals which are input from record player 100 to playback device 10 when a plurality of test signals for measuring a characteristic of record playback system 1 recorded on phonograph record 200 are played back by record player 100, the plurality of input signals corresponding to the plurality of test signals recorded; calculates a measurement error between the frequency characteristic of each of the plurality of input signals measured and a predetermined frequency characteristic; selects a frequency characteristic of which the measurement error is smallest from among the frequency characteristics of the plurality of input signals, as a measurement result of record playback system 1; and outputs the measurement result selected.

According to this, a plurality of test signals for measuring record playback system 1 are recorded on phonograph record 200, and the probability that all the measurement of the test signals will fail is low. For this reason, the frequency characteristic having the smallest measurement error described above, that is, the frequency that could be measured accurately can be selected as the measurement result of record playback system 1 without selecting the frequency characteristic having the large measurement error described above, that is, the frequency that failed to be measured as the measurement result of record playback system 1. Therefore, the characteristic of the record playback system can be effectively measured.

For example, the test signal may be an SS signal.

According to this, it is possible to measure with a good S/N ratio.

For example, the detection signal may be recorded on phonograph record 200 for detecting the playback speed on phonograph record 200 at a position adjacent at the outer circumferential side or the inner circumferential side of phonograph record 200 with respect to the position of the sound groove in which a plurality of test signals are recorded, playback device 10 may detect the playback speed at the position where a plurality of test signals are recorded on phonograph record 200 based on the detection signal, and the sample rate of record playback system 1 may be converted according to the detected playback speed.

According to this, the change in the playback speed generated by the change in the radius of phonograph record 200 due to the misalignment of the center hole of phonograph record 200, or the change in the radius of phonograph record 200 due to the track feed of the carter head at the time of cutting phonograph record 200 can be cancelled out and the measurement error can be reduced.

Phonograph record 200 has a plurality of test signals for measuring a characteristic of record playback system 1 recorded in a sound groove within one lap.

According to this, a plurality of test signals for measuring a characteristic of record playback system 1 are recorded on phonograph record 200, and the probability that all the test signal measurements will fail is low. For this reason, when playback device 10 or the like measures the characteristic of record playback system 1 using phonograph record 200, the characteristic of record playback system 1 can be effectively measured. Since a plurality of test signals are recorded in the sound groove within one lap, interference between adjacent sound grooves in the radial direction is less likely to occur, and the deterioration of the S/N ratio can be suppressed.

For example, the test signal may be an SS signal.

According to this, it is possible to measure with a good S/N ratio.

For example, a plurality of test signals may be recorded in the sound groove in the outer circumferential region of phonograph record 200.

According to this, since the playback speed is high in the outer circumferential region of phonograph record 200, the deterioration of the S/N ratio can be suppressed.

For example, the detection signal may be recorded on phonograph record 200 for detecting the playback speed on phonograph record 200 at a position adjacent at the outer circumferential side or the inner circumferential side of phonograph record 200 with respect to the position of the sound groove in which a plurality of test signals are recorded.

According to this, the change in the playback speed generated by the change in the radius of phonograph record 200 due to the misalignment of the center hole of phonograph record 200, or the change in the radius of phonograph record 200 due to the track feed of the carter head at the time of cutting phonograph record 200 can be detected.

For example, the detection signal may be recorded on the wall of the right channel in the sound groove adjacent at the outer circumferential side of phonograph record 200 with respect to the sound groove in which a plurality of test signals are recorded.

According to this, the deterioration of the S/N ratio can be suppressed.

For example, the detection signal may be recorded on the wall of the left channel in the sound groove adjacent at the inner circumferential side of phonograph record 200 with respect to the sound groove in which a plurality of test signals are recorded.

According to this, the deterioration of the S/N ratio can be suppressed.

Other Embodiments

As described above, an embodiment has been described as an example of the technique disclosed in this application. However, the technique in the present disclosure is not limited thereto, and can be applied to embodiments in which changes, replacements, additions, omissions, and the like are made as appropriate. It is also possible to combine the components described in the above embodiment to form a new embodiment.

For example, in the above embodiment, an example in which the test signal is an SS signal has been described, but the present invention is not limited thereto. For example, the test signal is not particularly limited as long as it is a known signal including a frequency component to be measured (for example, ordinary music, white noise, pink noise, or the like).

For example, in the above embodiment, the example in which the detection signal of the playback speed is recorded on phonograph record 200 has been described, but the detection signal of the playback speed may not be recorded on phonograph record 200.

For example, in the above embodiment, the example in which playback device 10 includes playback speed detector 14 has been described, but playback device 10 may not include playback speed detector 14.

The present disclosure can be realized not only as playback device 10, but also as a measurement method including steps (processes) performed by the components included in playback device 10.

Specifically, as shown in FIG. 5, the measurement method includes processes of measuring a frequency characteristic of each of a plurality of input signals which are input from a record player when a plurality of test signals for measuring a characteristic of a record playback system are played back by the record player in the record playback system, the plurality of test signals being recorded on a phonograph record, the plurality of input signals corresponding to the plurality of test signals recorded (step 11); calculating a measurement error between the frequency characteristic of each of the plurality of input signals measured and a predetermined frequency characteristic (step 12); selecting a frequency characteristic of which the measurement error is smallest from among the frequency characteristics of the plurality of input signals, as a measurement result of the record playback system (step 13); and outputting the measurement result selected (step 14).

For example, the measurement method may be executed by a computer (computer system). Then, the present disclosure can be realized as a program for causing a computer to execute the steps included in the measurement method. Furthermore, the present disclosure can be realized as a non-transitory computer-readable recording medium such as a CD-ROM having the program recorded thereon.

For example, when the present disclosure is realized by a program (software), each step is executed by executing the program using the hardware resources such as the CPU, the memory, and the input/output circuit of the computer. That is, each step is executed by the CPU acquiring data from the memory, the input/output circuit, or the like and performing an operation, or outputting the operation result to the memory, the input/output circuit, or the like.

The component included in playback device 10 of the above embodiment may be realized as a large scale integration (LSI) which is an integrated circuit (IC).

The integrated circuit is not limited to the LSI, and may be realized by a dedicated circuit or a general-purpose processor. A programmable FPGA or a reconfigurable processor in which the connections and settings of the circuit cells inside the LSI can be reconfigured may be utilized.

Furthermore, if an integrated circuit technology that replaces an LSI appears due to advances in semiconductor technology or another technology derived therefrom, naturally, the components included in playback device 10 may be integrated into an integrated circuit using that technology.

As described above, the embodiments have been described as examples of the technique in the present disclosure. To that end, the accompanying drawings and detailed explanations have been provided.

Therefore, the components described in the attached drawings and the detailed description may include not only the components essential for solving the problem but also the components not essential for solving the problem. For that reason, the fact that those non-essential components are described in the accompanying drawings or detailed description should not immediately determine that those non-essential components are essential.

Since the embodiments mentioned above are for exemplifying the technique in the present disclosure, various changes, replacements, additions, omissions, and the like can be made within the scope of the claims or the equivalent thereof.

INDUSTRIAL APPLICABILITY

The present disclosure can be applied to a device or the like for measuring a characteristic of a record playback system.

The invention claimed is:

1. A measurement device included in a record playback system including a record player, the measurement device comprising:
a processor; and
a memory,
wherein the processor, by executing a program stored in the memory, is configured to:
measure a frequency characteristic of each of a plurality of input signals which are input from the record player to the measurement device when a plurality of test signals for measuring a characteristic of the record playback system are played back by the record player, the plurality of test signals being recorded on a phonograph record and comprising a single test signal recorded a plurality of times to provide the plurality of test signals within a lap of the phonograph record, the plurality of input signals corresponding to the plurality of test signals recorded;
calculate a measurement error between the frequency characteristic of each of the plurality of input signals measured and a predetermined frequency characteristic, which is the frequency characteristic of an ideal input signal input to the measurement device when the record player plays back a test signal;
select a frequency characteristic of which the measurement error is smallest from among the frequency characteristics of the plurality of input signals, as a measurement result of the record playback system; and
output the measurement result selected as the measured characteristic of the record playback system.

2. The measurement device according to claim 1, wherein the plurality of test signals are swept-sine signals.

3. The measurement device according to claim 1, wherein:
a detection signal for detecting a playback speed on the phonograph record is recorded at a position adjacent at an outer circumferential ide or an inner circumferential side of the phonograph record with respect to a position of a sound groove in which the plurality of test signals are recorded, and
the processor executing the program is configured to:
detect the playback speed at the position where the plurality of test signals are recorded on the phonograph record, based on the detection signal; and
convert a sample rate of the record playback system according to the playback speed detected.

4. A measurement method comprising:
measuring a frequency characteristic of each of a plurality of input signals which are input from a record player when a plurality of test signals for measuring a characteristic of a record playback system are played back by the record player in the record playback system, the plurality of test signals being recorded on a phonograph record and comprising a single test signal recorded a plurality of times to provide the plurality of test signals within a lap of said phonograph record, the plurality of input signals corresponding to the plurality of test signals recorded;
calculating a measurement error between the frequency characteristic of each of the plurality of input signals measured and a predetermined frequency characteristic, which is the frequency characteristic of an ideal input signal input to the measurement device when the record player plays back a test signal;
selecting a frequency characteristic of which the measurement error is smallest from among the frequency characteristics of the plurality of input signals, as a measurement result of the record playback system; and
outputting the measurement result selected the measured characteristic of the record playback system.

5. A non-transitory computer-readable recording medium having recorded thereon a program for causing a computer to execute the measurement method according to claim 4.

* * * * *